J. V. CAPEK.
Anglometer.

No. 211,968.  Patented Feb. 4, 1879.

WITNESSES:
Francis McArdle
C. Sedgwick

INVENTOR:
J. V. Capek
BY Munn & Co.
ATTORNEYS.

UNITED STATES PATENT OFFICE.

JOHN V. CAPEK, OF NEW YORK, N. Y.

IMPROVEMENT IN ANGLOMETERS.

Specification forming part of Letters Patent No. 211,968, dated February 4, 1879; application filed December 18, 1878.

*To all whom it may concern:*

Figure 1:
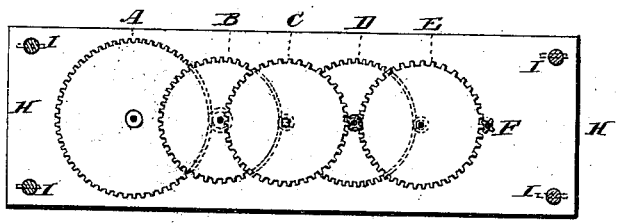
Figure 2:
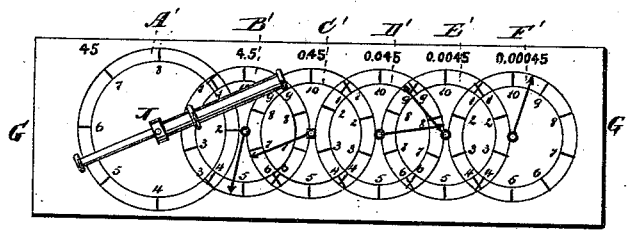

Be it known that I, JOHN V. CAPEK, of the city, county, and State of New York, have invented a new and useful Improvement in Anglometers, of which the following is a specification:

Figure 1 is a top view of my improved instrument, the top plate and pointers being removed. Fig. 2 is a top view of the instrument.

Similar letters of reference indicate corresponding parts.

The object of this invention is to furnish an improved instrument for the use of astronomers, surveyors, and others, for dividing angles into parts more minute than has heretofore been practicable, even where the best and most expensive contrivances are employed.

The invention consists in a series of proportional wheels, provided with pointers and dials, in connection with a wheel upon which a telescope or pointer is attached, as hereinafter fully described.

A B C D E F, &c., represent a series of wheels attached to pivots which are pivoted to two plates, G H, connected and held at the proper distance apart by posts I. Each preceding wheel meshes into a pinion attached to the pivot of the succeeding wheel, the first pivot being thus without a pinion, and the last pivot without a wheel. To the upper end of the pivot of the first wheel, A, is attached a telescope, J, or a pointer provided with sights. To the upper ends of the other pivots are attached pointers. Around the pivot of the first wheel, A, is formed a circle of division-marks, dividing the circle into eight equal parts or spaces, each of forty-five degrees, (45°.) Around each of the other pivots is formed a circle of division-marks, divided into ten equal parts or spaces.

By turning the wheel A by means of a key placed upon the pinion of the wheel C, the telescope J may be made to describe a full circle, or, in other words, it moves through an angle of three hundred and sixty degrees, (360°.)

The wheel A has eighty teeth, and the pinion of wheel B, into which it meshes, has ten teeth, so that the second wheel, B, is turned through an entire revolution by the turning of the wheel A through one-eighth of a revolution. All the succeeding wheels are so formed that each turns around ten times while its preceding wheel turns once. By this construction the turning of the wheel A through one-eighth of a revolution turns the wheel B once, the wheel C ten times, the wheel D one hundred times, the wheel E one thousand times, and the wheel F ten thousand times, and so on; hence the arc that the pointer of the wheel F describes is one-eighth of the circle A taken ten thousand times. These arcs are proportional—that is, each revolution of the pointer F has its proportional part in the one-eighth of the arc described by the telescope J, the said arcs standing to each other in the ratio of one to ten thousand. This one-ten-thousandth it is, of course, impossible to indicate visibly on the very best anglometers now in use. One-eighth of circle A equals forty-five degrees, (45°.) The circle B indicates the forty-five degrees (45°) divided into ten equal parts, each of which is therefore equal to four and five-tenths degrees, (4.5°.) The tenth of the following circles is indicated in the same descending ratio—that is to say, C equals forty-five-hundredths degrees, (0.45°;) D equals forty-five-thousandths degrees, (0.045°;) E equals forty-five-ten-thousandths degrees, (0.0045°;) and F equals forty-five-hundred-thousandths degrees, (0.00045°).

When the telescope and the various pointers stand in the positions shown in Fig. 2, the angle measured will be as follows:

$$A = (1 + \phantom{x}) \times 45° = 45° +$$
$$B = (4 + \phantom{x}) \times 4.5° = 18° +$$
$$C = (6 + \phantom{x}) \times 0.045° = 2.7 +$$
$$D = (7 + \phantom{x}) \times 0.045° = 0.315 +$$
$$E = (8 + \phantom{x}) \times 0.0045° = 0.036 +$$
$$F = (9 + \tfrac{1}{2}) \times 0.00045° = 0.004275$$

the + in each case being represented by the measurement taken from the succeeding wheels, so that the exact measurement of the angle will be the sum of the numbers in the last column of figures, namely, 66.055275°.

It is evident that these disagreeable fractional results proceed from the construction of wheel A, which, in a machine intended for practical use, should have at least two hundred and sixteen (216) teeth, so that wheel B with six pinions would turn nine times for each one-fourth of circle A. Then the telescope would indicate ten degrees for each division, the pointer of wheel B would indicate single degrees, the pointer of wheel C tenths of degrees, the wheel D hundredths, the wheel E thousandths, and the wheel F ten-thousandths, &c.

The power of the machine for measuring microscopic angles may be increased in three ways: first, by enlarging the wheel A—that is to say, by increasing the number of its teeth; second, by enlarging the dial of the last pinion and dividing it into a greater number of parts; and, third, by increasing the number of wheels.

An astronomical anglometer might be made with seven wheels, the wheel A having two thousand one hundred and sixty teeth, so that the wheel B, with six pinions, would turn around once for each degree, and the diameter of the dial of the last wheel being four feet, and its circumference being twelve and fifty-six-hundredths feet, the pointer of the last dial would then indicate a circumference of three hundred and thirty-nine millions one hundred and twenty thousand feet, or eighteen thousand eight hundred and forty geographical miles—a grand astronomical limbus having a circumference of more than three times the length of the earth's equator.

This anglometer also furnishes the means of measuring the parallax of planets, if such measurement is at all possible. It may also be attached to a school-anglometer, in which case it may be made with three wheels, and may have a pointer upon wheel A. It may also be attached to all astronomical and surveying apparatus, in which cases the wheel A must always be provided with a telescope.

Having thus described my invention, I claim as new and desire to secure by Letters Patent—

A series of proportional wheels, B C, &c., provided with pointers and dials, in connection with a wheel, A, upon which a telescope or pointer is attached, substantially as herein shown and described.

JOHN V. CAPEK.

Witnesses:
JAMES T. GRAHAM,
C. SEDGWICK.